United States Patent [19]

Bandet et al.

[11] 3,997,217

[45] Dec. 14, 1976

[54] MACHINE OR VEHICLE COMPONENT AND REINFORCEMENT ELEMENT

[75] Inventors: Pierre Bandet, Neuilly; Roger Boulassier, Noisy-le-Sec; Jacques Dufour, Paris, all of France

[73] Assignee: Le Magnesium Industriel, Paris, France

[22] Filed: June 5, 1974

[21] Appl. No.: 476,386

[52] U.S. Cl. .............................................. 301/5 R

[51] Int. Cl.[2] ........................................ B62D 55/14

[58] Field of Search .............. 301/37 R, 37 ST, 5.3, 301/5 R, 63 R, 63 PW, 65; 295/7, 8, 21, 12, 31 R; 152/352, 353; 305/21, 23, 24, 27, 28, 29, 39–60

[56] References Cited

UNITED STATES PATENTS

| | | | |
|---|---|---|---|
| 341,206 | 5/1886 | Bacher | 301/5.3 |
| 726,463 | 4/1903 | Richardson | 301/5.3 |
| 2,970,867 | 2/1961 | Ruf | 305/56 |
| 2,984,524 | 5/1961 | Franzen | 305/24 |
| 3,107,115 | 10/1963 | Kastner | 295/31 R |
| 3,360,300 | 12/1967 | Carter | 301/63 PW |
| 3,729,041 | 4/1973 | Kutoba | 152/353 R |

FOREIGN PATENTS OR APPLICATIONS

| | | | |
|---|---|---|---|
| 1,939,239 | 2/1971 | Germany | 305/56 |
| 89,176 | 5/1937 | Sweden | 295/12 |

*Primary Examiner*—Stanley H. Tollberg
*Attorney, Agent, or Firm*—McDougall, Hersh & Scott

[57] ABSTRACT

A machine or vehicle component subject to wear by friction and/or recurring impact, such as a roller for a tracked engine, made of light weight alloy and comprising at least one reinforcing element of hard material, distinguished by the fact that the reinforcing element, fixed to the component by bonding, has a substantially T-shaped cross-section, the foot of the T being accommodated in a groove formed in the component.

3 Claims, 3 Drawing Figures

3
4
4
1
2

1
2
4

MACHINE OR VEHICLE COMPONENT AND REINFORCEMENT ELEMENT

This invention relates to a machine or vehicle component subject to wear by friction and/or to recurring impact.

In order to lighten the various components of machines or vehicles, such as tracked engines, they are made of the lightest possible alloys, for example magnesium-based alloy. Unfortunately, these alloys do not provide for satisfactory resistance to wear, nor are they sufficiently impact-resistant.

It is for this reason that the sides of the rollers on tracked engines have to be protected against wear due to friction and against the impact of track links, chains or stones.

A similar problem arises in the case of pulleys and axle hubs and in the case of the discs used in crushers or mixers. The same applies as regards those structural components of a ship or an aircraft involved in landing or in contact with the ground, which have to be reinforced by means of a skid or prop of hard material.

It has been proposed to protect the sides of rollers by coating them with a hard material applied over a keying layer. However, this process is difficult to work in practice and the risk of the keying layer deteriorating in operation is relatively high.

Accordingly, the object of the invention is to protect the vulnerable parts of these components in such a way as to obviate the aforementioned disadvantages.

According to the invention, the machine or vehicle component subject to wear by friction and/or recurring impact, such as a roller for a tracked engine, made of light weight alloy and comprising at least one reinforcing element of hard material, is distinguished by the fact that the reinforcing element bonded to the component is substantially T-shaped in cross-section, the foot of the T being accomodated in a groove formed in the component.

By virtue of this arrangement, the reinforcing element is fixed firmly to the component to be protected. Its profile gives it a high amount of inertia while the rigidity provides for the effective distribution of impact and locally concentrated forces over the constituent material of the component. Accordingly, the component is able to withstand the effects of friction, deformation and indentation.

In addition, the T-shaped cross-section provides for an extremely effective bonding surface and improves the performance of the adhesive used with respect to shear forces.

In the case of components generally circular in shape, such as the rollers of tracked engines, the reinforcing element is in the form of a ring or ring sector fixed to one side of the roller.

One embodiment of the invention is described in the following with reference to the accompanying drawings, wherein.

Figure 1:
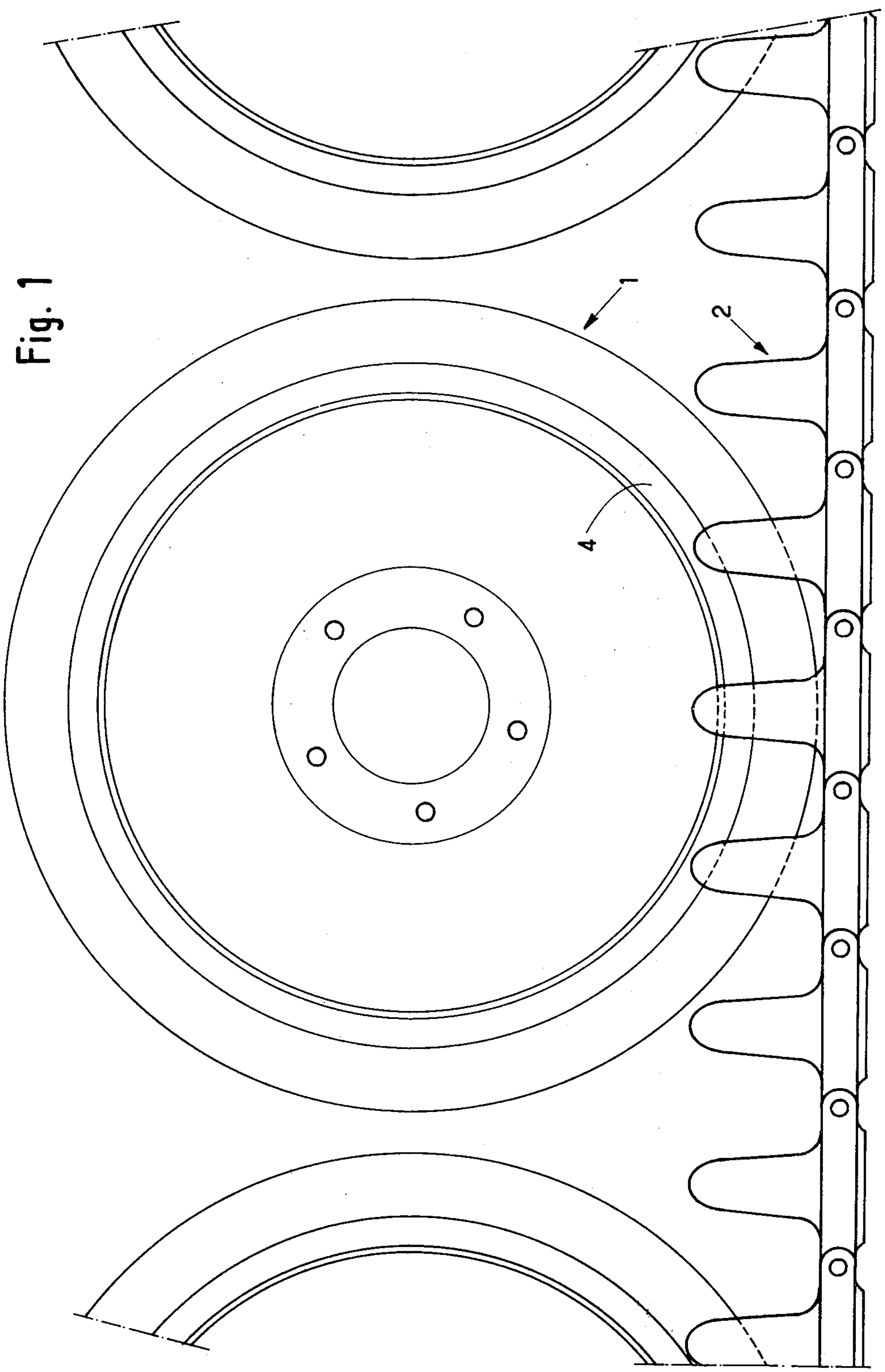
FIG. 1 is a partial elevational view showing some rollers and the associated track of a tracked engine.
Figure 2:
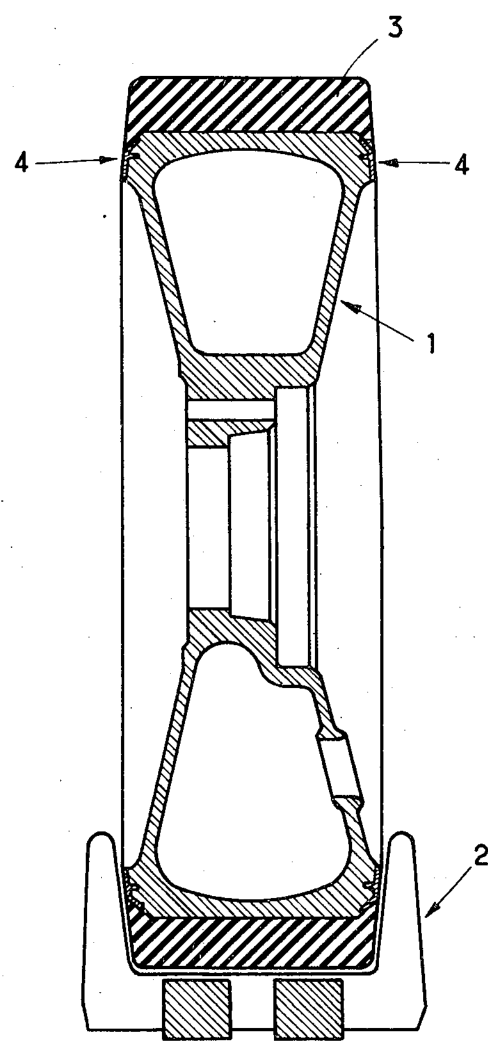
FIG. 2 is a sectional view taken on a diameter of a roller.
Figure 3:
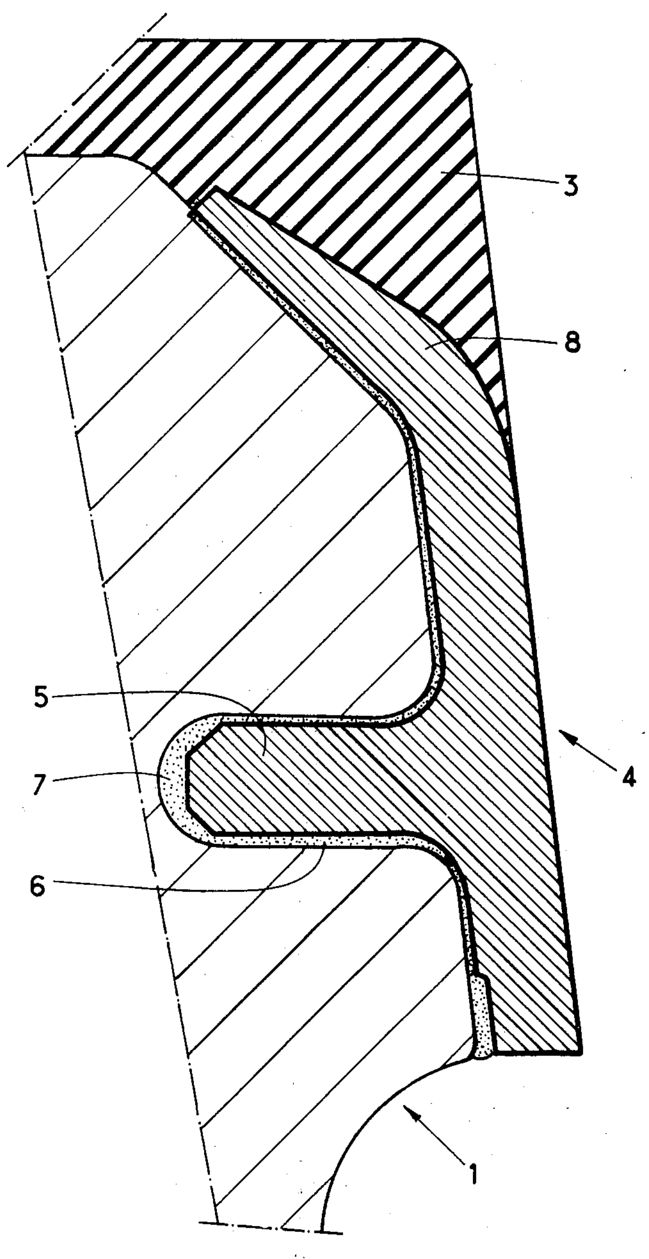
FIG. 3 is a sectional view on a larger scale showing how a reinforcing element is fixed to a roller.

In the embodiment illustrated, rollers 1 of a tracked engine are associated with a track 2 in known manner.

Each roller, made of magnesium-based alloy, is provided with a conventional solid rubber tire 3.

On each of its sides, the roller is provided with a reinforcing element 4 in the form of a ring of hard material, such as treated grade XC 48 steel, with a substantially T-shaped cross-section. The foot 5 of the T is accomodated in a groove 6 formed in the side of the roller.

The ring is fixed by bonding with a conventional adhesive 7, such as Araldite. The arm 8 of the T, situated on the outside, is held between the roller and the tire and curved to correspond to the profile of the roller, and provides for considerable inertia in the radial direction.

The reinforcing element is thus firmly fixed to the roller and effectively protects it against wear and recurring impact. In addition, it provides an excellent key for the solid rubber tire, which would not be the case if the tire were in direct contact with the roller.

When the tire 3 and the ring 4 are worn, the ring can be removed and replaced by heating to a temperature sufficient to soften the adhesive following removal of the tire. It is also possible to recondition the ring or to apply a hard material different from that of the ring.

By forming a seal between the reinforcing element and the roller, fixing the ring by bonding provides for improved resistance to corrosion in the most vulnerable zones.

We claim:

1. A roller for turning in a track wherein the side walls of the roller are subjected to impact and wear, in which the roller comprises a cylindrical core, a solid rubber tire about the periphery of the cylindrical core, and having an integral portion which extends over the adjacent side wall portion of the core, an annular groove extending inwardly from the surface of the side wall of the core adjacent the outer peripheral portion, and a ring formed of a metal characterized by high resistance to impact and abrasion having a portion interfitting with the groove in the core and overlying the grooved side walls of the core with an outer portion disposed between the core and a portion of the solid rubber tire overlying the side walls of the core.

2. A roller as claimed in claim 1 in which the ring member comprises a T-shaped member in cross-section with the stem of the T dimensioned to be received in fitting relationship within the groove of the core when the cross members of the T engage the side walls of the core, and adhesive means for interbonding the stem portion within the groove for securing the ring member on the core.

3. A roller for turning in a track wherein the side walls of the roller are subjected to impact and wear, in which the roller comprises a cylindrical core, a solid rubber tire about the periphery of the cylindrical core, an annular groove in the outer surface of the side walls of the core adjacent the outer peripheral portion, and a ring formed of metal characterized by high resistance to impact and abrasion having a portion interfitting with the groove in the core to overlie the grooved side walls of the core in which the ring members are formed with a curvilinear end portion which corresponds with a curvilinear peripheral edge portion of the core and is disposed between the core and the corresponding overlying portion of the rubber tire.

* * * * *